US009891652B2

(12) United States Patent
Epstein et al.

(10) Patent No.: US 9,891,652 B2
(45) Date of Patent: Feb. 13, 2018

(54) CRITICAL PATHS ACCOMMODATION WITH FREQUENCY VARIABLE CLOCK GENERATOR

(71) Applicant: Marvell Israel (M.I.S.L) Ltd., Yokneam (IL)

(72) Inventors: Lev Epstein, Netanya (IL); Eitan Rosen, Abirim (IL)

(73) Assignee: MARVELL ISRAEL (M.I.S.L) LTD., Yokneam (IL)

( * ) Notice: Subject to any disclaimer, the term of this patent is extended or adjusted under 35 U.S.C. 154(b) by 0 days.

(21) Appl. No.: 15/152,183

(22) Filed: May 11, 2016

(65) Prior Publication Data

US 2016/0334832 A1 Nov. 17, 2016

Related U.S. Application Data

(60) Provisional application No. 62/162,034, filed on May 15, 2015.

(51) Int. Cl.
*G06F 1/08* (2006.01)

(52) U.S. Cl.
CPC .................................. *G06F 1/08* (2013.01)

(58) Field of Classification Search
CPC .. H03K 5/00; H03K 5/135; G06F 1/00; G06F 1/04; G06F 1/08; G06F 1/10; G11C 7/00; G11C 7/22
USPC ......................................................... 327/291
See application file for complete search history.

(56) References Cited

U.S. PATENT DOCUMENTS 9,088,288 B1* 7/2015 Rosen ........................ H03L 7/00
2010/0299557 A1* 11/2010 Bull ........................... G06F 1/10
714/10

* cited by examiner

*Primary Examiner* — Lincoln Donovan
*Assistant Examiner* — David Mattison

(57) ABSTRACT

Aspects of the disclosure provide an integrated circuit and method for varying a frequency of a clock signal to accommodate critical paths in the integrated circuit. The integrated circuit can include a clock generator configured to generate a clock signal having a clock frequency that is variable, circuitry that includes a plurality of critical modules that can be selectively activated to operate under control of the clock signal, each critical module including one or more critical paths that a default clock frequency cannot accommodate, and a controller that causes the clock generator to vary the clock frequency of the clock signal based on propagation delays of those critical paths in activated critical modules.

20 Claims, 6 Drawing Sheets

CRITICAL PATHS ACCOMMODATION WITH FREQUENCY VARIABLE CLOCK GENERATOR

INCORPORATION BY REFERENCE

This present disclosure claims the benefit of U.S. Provisional Application No. 62/162,034, "Critical Path Relief with ARO" filed on May 15, 2015, which is incorporated herein by reference in its entirety.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

In current synchronous design of integrated circuits, critical paths determine performance of a system, and the most critical path in a system determines the speed of the system. Critical paths are often difficult to design to achieve an aggressive target. Significant efforts and resources are invested to optimize those critical paths, even though some of them are seldom active in operation.

SUMMARY

Aspects of the disclosure provide an integrated circuit that varies a frequency of a clock signal to accommodate critical paths in the integrated circuit. The integrated circuit can include a clock generator configured to generate a clock signal having a clock frequency that is variable, circuitry that includes a plurality of critical modules that can be selectively activated to operate under control of the clock signal, each critical module including one or more critical paths that a default clock frequency cannot accommodate, and a controller that causes the clock generator to vary the clock frequency of the clock signal based on propagation delays of those critical paths in activated critical modules.

In an Embodiment, the integrated circuit further includes a logic path enabler configured to generate enable signals to selectively activate critical modules.

In an embodiment, the controller, based on the enable signals, selects a clock setting having a frequency that can accommodate the critical paths in the activated critical modules from multiple preconfigured clock settings each corresponding to a predetermined clock frequency, and subsequently transmits a control signal indicating the selected clock setting to the clock generator.

In an embodiment, each critical module includes a module critical path having the longest propagation delay among logic paths in this module, and the controller causes the clock generator to generate a clock signal at a highest possible frequency that can accommodate module critical paths in each critical module that are activated. In an example, each critical module has an associated clock setting having a highest clock frequency among multiple preconfigured clock settings having frequencies that can accommodate a module critical path of the each critical module, and the controller selects a clock setting having a lowest clock frequency from clock settings associated with activated critical modules based on received enable signals when an enable signal arrives or terminates, and subsequently transmits a control signal indicating the selected clock setting to the clock generator.

In an embodiment, each critical module when activated has one or more cycle critical paths corresponding to one or more cycles of the clock signal, each cycle critical path having the longest propagation delay among critical paths in operation during the corresponding cycle of the clock signal in the each critical module, and the controller causes the clock generator to generate, for a cycle of the clock signal, a clock signal at a highest possible frequency that can accommodate cycle critical paths corresponding to the cycle of the clock signal in activated critical modules. In an example, each cycle critical path has an associated clock setting having a highest clock frequency among multiple preconfigured clock settings having frequencies that can accommodate the each cycle critical path, and the controller selects, for the cycle of the clock signal, a clock setting that has a lowest clock frequency from clock settings associated with cycle critical paths corresponding to the cycle of the clock signal in activated critical modules based on received enable signals, and subsequently transmits a control signal indicating the selected clock setting to the clock generator.

In an embodiment, the logic path enabler generates a trigger signal in advance of generating an enable signal for activating a critical module, and the controller, in response to the trigger signal, causes the clock generator to vary the frequency of the clock signal when the critical module starts to operate.

In an example, the circuitry further includes non-critical modules operating under control of the clock signal at the default frequency, and the controller causes the clock generator to change the frequency of the clock signal from the default frequency to a frequency that is lower than the default frequency when a critical module is activated.

In an embodiment, the clock generator generates the clock signal with a frequency being a function of a number of inversion delays. In an example, the clock generator includes a first pulse generator configured to output first pulses, each first pulse having a first leading edge, a first trailing edge, and a first pulse width being a function of the inversion delays, and a second pulse generator configured to output second pulses, each second pulse having a second leading edge, a second trailing edge, and a second pulse width being a function of the inversion delays. In addition, the first pulse generator and the second pulse generator are cross-coupled, such that the first pulse generator outputs one of the first pulses in response to the second trailing edge, and the second pulse generator outputs one of the second pulses in response to the first trailing edge.

Aspects of the disclosure provide a method for varying a frequency of a clock signal to accommodate critical paths in an integrated circuit. The method can include selectively activating a critical module of a plurality of critical modules that operates under control of a clock signal generated from a clock generator, each critical module including one or more critical paths that a default clock frequency cannot accommodate, and varying, by the clock generator, a clock frequency of the clock signal based on propagation delays of those critical paths in activated critical modules.

BRIEF DESCRIPTION OF THE DRAWINGS

Various embodiments of this disclosure that are proposed as examples will be described in detail with reference to the following figures, wherein like numerals reference like elements, and wherein.

DETAILED DESCRIPTION OF EMBODIMENTS

Figure 1:
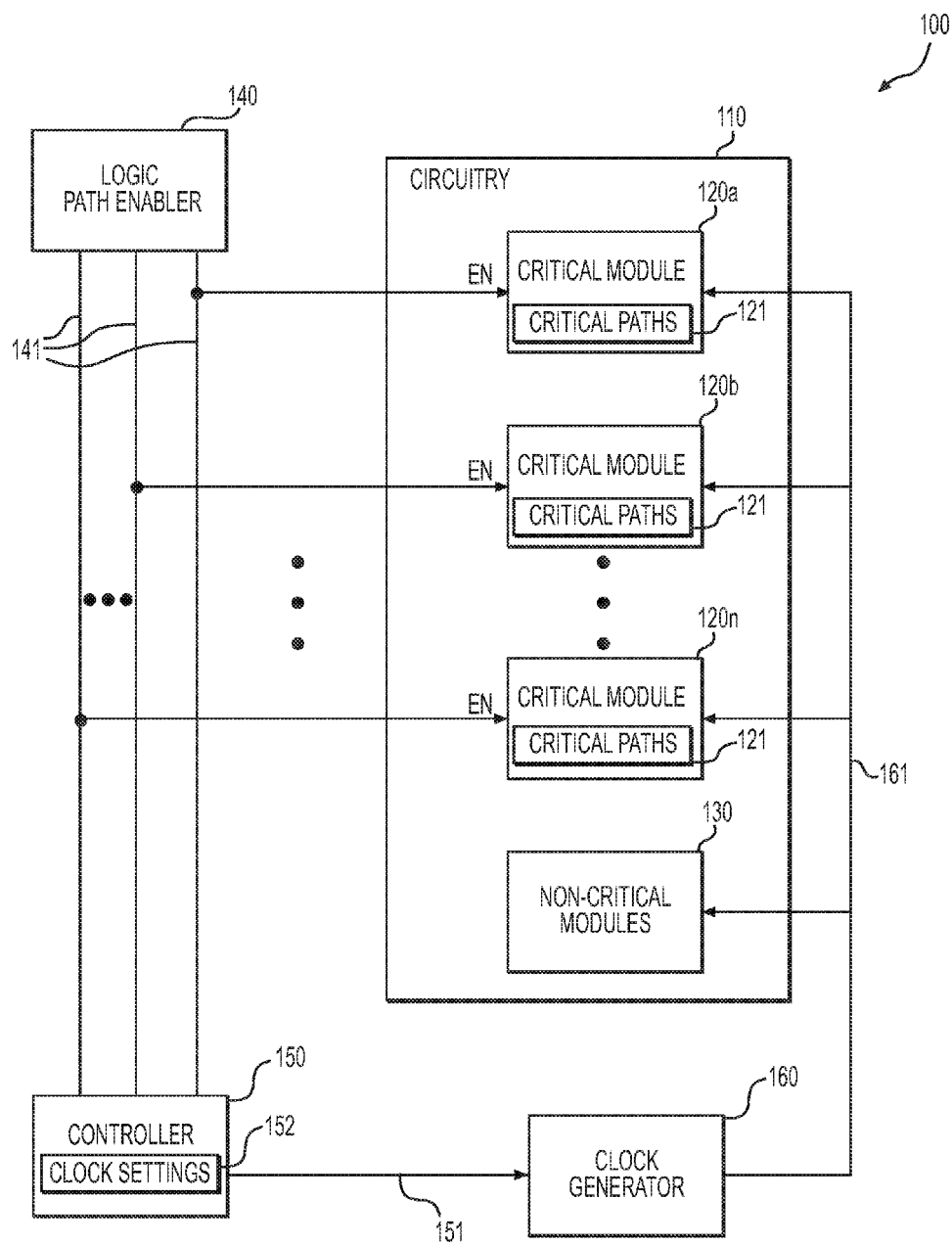
FIG. 1 shows a digital system according to an embodiment of the disclosure.

FIG. 1 shows a digital system 100 according to an embodiment of the disclosure. The digital system 100 includes circuitry 110, a logic path enabler 140, a controller 150, and a clock generator 160. The circuitry 110 includes a plurality of critical modules 120a-120n, and a plurality of non-critical modules 130. Those elements are coupled together as shown in FIG. 1.

According to an aspect of the disclosure, the digital system 100 employs a mechanism for varying a clock frequency to accommodate critical paths. In an example, the digital system 100 typically operates at a default clock frequency while the non-critical modules 130 are in operation state, and the critical modules 120a-120n are in non-active state. The non-critical modules 130 can operate properly under the default clock frequency; however, the critical modules 120a-120n each require a slower clock frequency for proper operation, because each critical module 120a-120n includes one or more logic paths that have propagation delays that the default clock frequency cannot accommodate, thus each critical module 120a-120n may fail under the default clock frequency. Those logic paths are referred to as critical paths, and each critical path may require a different clock frequency. When one or more critical modules 120a-120n are about to be in operation, the clock generator 160 can change clock frequency from the default frequency to a slower frequency, such that the activated critical modules 120a-120n can operate properly.

In addition, in one example, members of the set of critical paths in operation can vary (increase or decrease) from time to time. The clock generator 160 can accordingly vary the clock frequency to accommodate critical paths in operation, while simultaneously maintaining the highest possible clock frequency.

When there are no critical modules activated, the clock generator 160 returns to the faster default frequency. Thus, the digital system 110 can operate at a high speed, and only slow down when some critical modules 120a-120n are activated, leading to a high performance of the digital system 100. Additionally, implementing the above mechanism in integrated circuits (IC) design can save efforts and circuit resources (power consumption, chip space) for optimizing logic paths.

The digital system 100 processes signals and data to fulfill various functions. In one embodiment, the digital system 100 is in whole or in part implemented in one or more processors, such as a central processing unit (CPU) implemented with integrated circuits. The circuitry 110 may include digital logic circuits for processing digital data. In one example, the circuitry 100 performs data-path functions in a processor. In one example, the digital logic circuits are organized into multiple modules, such as an adder, a multiplier, a comparator, and the like. Each module includes combinational logic circuits and/or sequential logic circuits, and performs a certain function.

Generally, sequential logic circuits operate synchronously under control of a clock signal. A sequential logic circuit can include a sequence of combinational logic circuits with memory elements, such as flip-flops, latches, and the like, connected at either ends of each combinational circuits. A combinational logic circuit and the two memory elements connected at either ends forms a stage of the sequential logic circuit.

In an example, a data signal is clocked through a first flip-flop from its input to its output when triggered by a first rising edge of a clock signal. Then, the data signal passes through a combinational circuit connected between the first flip-flop and a second flip-flop, and reaches an output of the combination circuit. Thereafter, the data signal is received at the second flip-flop, and takes a period of time to become stable, such that the second flip-flop can sample the data signal properly when a second rising edge of the clock signal arrives. Finally, triggered by the second rising edge of the clock signal, the digital signal is clocked through the second flip-flop. In this way, the digital signal is transmitted through a stage of a sequential logic circuit.

In the above example, the digital data experiences at least three portions of propagation delays between the first and the second rising edge of the clock signal. The first portion of propagation delay is the interval between arrival of the first rising edge and when the digital data reaches the output of the first flip-flop. The second portion of propagation delay is the interval for the data signal passing through the combinational logic. The third portion of propagation delay is the interval for the data signal to become stable between the arrival at the input of the second flip-flop and the arrival of the second rising edge. Accordingly, a cycle duration of the clock signal (referring to the length of a cycle, while a cycle or clock cycle refers to a time interval between two adjacent rising or falling edges of the clock signal), have to be larger than a sum of the three portions of propagation delays in order to properly transmit the data signal through the respective stage of the sequential circuit. When this condition is satisfied, it is said that the cycle duration of the clock signal can accommodate the propagation delay of the data signal passing the combinational logic circuit, with the other two portions of propagation delays having already been considered into this account; it is also said that the clock signal or the frequency of the clock signal can accommodate the propagation delays.

In the above example, a route which the digital signal passes when traverses the combinational logic circuit is referred to as a logic path. A logic path can include a sequence of circuit elements, such as various logic gates. In addition, based on above description, each logic path has a propagation delay which a signal passing the logic path will experience. When a clock signal/frequency/cycle duration can accommodate a propagation delay of a logic path, it is said that the clock signal/frequency/cycle duration can accommodate the logic path.

Depending on configurations of a combinational logic circuit, logic paths for a data signal passing through the combinational logic circuit can be invariable or variable. For example, a combinational logic circuit in one stage can receive a second input signal from another memory element in addition to a first input signal. Different inputs of the second signals may cause the first signal to pass through different logic path.

In FIG. 1, the multiple modules in the circuitry 110 are categorized as critical modules 120a-120n, and non-critical modules 130. Propagation delays of logic paths in the non-critical modules can be accommodated by the default frequency of the digital system 100, while the critical modules 120a-120n each include at least one logic path 121 that has a propagation delay the default frequency cannot accommodate. These logic paths 121 are referred to as critical paths in this detailed description. When these critical paths 121 are about to be in operation, the digital system 100 slows down, and the clock signal generator 160 varies frequency of the clock signal to a lower frequency to accommodate the critical paths 121.

As shown, each critical module 120a-120n receives a clock signal 161 from the clock generator 160. The non-critical modules 130 also receive the same clock signal 161 from the clock generator 160. Of course, the clock signal 161 may pass a clock signal distribution network before reaching each module 120a-120n/130 in alternative examples. In addition, each critical module 120a-120n receives an enable signal 141 from the logic path enabler 140. Further, although not shown, there can be multiple connections among the critical modules 120a-120n and the non-critical modules 130, thus that data signals can be transmitted between those modules.

The logic path enabler 140 generates the enable signals 141 to selectively activate the critical modules 120a-120n when necessary for performing functions of the digital system 100. When an enable signal 141 is generated, the enable signal 141 is also transmitted to the controller 151. In an example, the logic path enabler 140 also generate control signals (not shown) to control operation of the non-critical modules 130. In one example, the logic path enabler 140 operates as a control unit in a processor. Accordingly, the logic path enabler 140 reads instructions from a memory, decodes the instructions to generate multiple control signals to coordinate operation of function modules 120a-120n or 130 in the circuitry 110.

The controller 150 causes the clock generator 160 to vary the clock frequency of the clock signal 161 based on propagation delays of those critical paths 121 in critical modules 120a-120n that are activated. For example, the circuitry 110 initially operates at a default frequency. The non-critical modules 130 are in operation state, while no critical modules 120a-120n are activated. Then, a first and a second critical modules 120a-120n are activated. The first or second critical module can be any one of the critical modules 120a-120n. The first critical module 120a-120n includes a first critical path. The first critical path has a first propagation delay that is the largest one among all critical paths in the first critical module. Such a logic path is referred to as a module (wide) critical path of the respective critical module 120a-120n (the first critical module in this case). Similarly, the second critical module 120a-120n includes a second critical path that is a module critical path of the second critical module 120a-120n and has a second propagation delay. In addition, the second propagation delay is longer than the first propagation delay.

In order for the two activated critical modules to operate properly, a clock frequency having a cycle duration that can accommodate both the first and the second propagation delays are required. Accordingly, the controller 150 causes the clock generator to vary the generate clock signal 161 from the default frequency to a lower frequency. The lower frequency has a highest possible frequency (having shortest possible cycle duration) but can accommodate the second module critical path. As a result when operating both of the first and the second critical modules, the digital system 100 operates at a speed slower than the speed of of its default frequency. When the two critical modules are deactivated at the end of this process, the controller 150 causes the clock generator 160 to return to the default frequency, thereby increasing the operation speed of the digital system 100.

In one example, the controller 150 selects a clock setting 152 from a plurality of clock settings 152 based on the enable signals. Each of clock setting 152 may be a preconfigured setting that includes a set of data describing parameters for configuring the clock generator 160 to generate a clock signal at a predetermined frequency. In one example, the clock setting 152 may be a control vector that includes a sequence of binary bits. When a clock setting 152 is received at the clock generator 160, the clock generator 160 can adjust its configurations accordingly to generate the clock signal 161 at the predetermined frequency.

In one example, based on pre-configurations, each enable signal 141 is associated with critical paths 121 in respective critical module 120a-120n, and clock settings corresponding to the critical paths 121. A clock setting 152 may be determined based on received enable signals 141. After a clock setting 152 is determined and selected, the controller transmits a control signal 151 indicating the selected clock settings 152 to the clock generator 160.

The clock generator 160 is configured to generate a clock signal 161 having a clock frequency that is variable. In addition, the clock generator 160 varies the clock signal 161 according to a clock setting 152 received from the controller 150. In an example, the clock generator 160 is capable of adjusting the clock frequency instantly, for example, within one cycle of the clock signal 161 after receiving a clock setting 152. In one example, the clock generator 160 is capable of adjusting the clock frequency in a high resolution, such as an inversion delay of an inverter.

According to an aspect of the disclosure, the above described mechanism for varying a clock frequency to accommodate critical paths can have two operation modes: module based mode, and cycle based mode. In module based mode, the clock frequency is adjusted based on activation of critical modules, wherein the clock frequency is changed when event of activating or deactivating a critical module 120a-120n takes place. While in cycle based mode, the clock frequency is adjusted cycle by cycle during a period when there is at least one critical module 120a-120n is activated.

Figure 2:
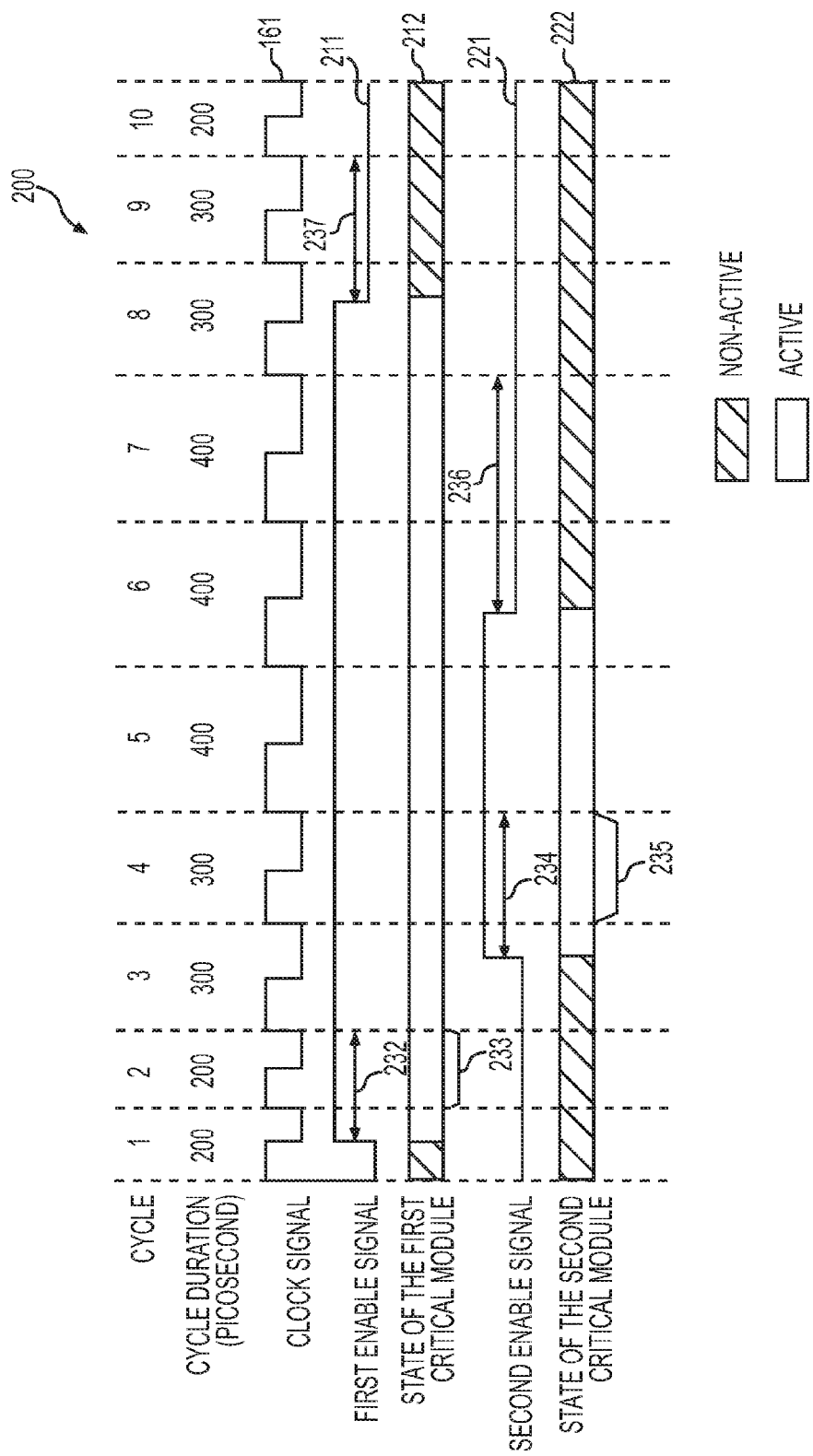
FIG. 2 shows a timing diagram illustrating a clock frequency variation process according to an embodiment of the disclosure.

FIG. 2 shows a timing diagram 200 illustrating a clock frequency variation process according to an embodiment of the disclosure. During this clock frequency variation process, the digital system 100 is operating in module based mode to vary the clock frequency of the clock generator 160.

In module based mode, in one example, each critical module 120a-120n includes a module critical path, and the clock frequency is adjusted based on the module critical paths of the activated critical modules 120a-120n. The module critical path of a critical module refers to a logic path having the longest propagation delay among all critical paths of the critical module. During clock cycles when a critical module 120a-120n is activated, a module critical path of this critical module 120a-120n may not be in operation for all clock cycles. For example, a critical module is activated for 5 cycles when enabled, and only in a third cycle, the module critical path of this critical module is in operation.

In an example, when the digital system 100 is operating in module based mode, and initially at the default frequency, one of the critical modules 120a-120n is activated. During a period when the one of the critical modules 120a-120n is in active state, the controller 150 causes the clock generator 160 to generate a clock signal having a frequency that can accommodate a propagation delay of a module critical path of this activated critical module, even during clock cycles when the module critical path is not in operation.

For another example, when the digital system 100 is operating in module based mode, more than one critical module 120a-120n are in active state during a period of time. During the period of time, the controller 150 causes the clock generator 160 to generate a clock signal that can accommodate propagation delays of module critical paths of all those activated modules, even some module critical paths are not in operation during some clock cycles.

The above described module based mode can be applied to the following scenarios. In a first scenario, a module critical path is part of a sequence of logic stages operating in a pipelining fashion, and is in operation state most of the time when the critical module is activated. Thus, this critical module requires a clock frequency that can accommodate the module critical path most of the time during being activated.

In a second scenario, which critical paths will be in operation is uncertain when a critical module is activated. As described earlier, a data signal may pass through different logic paths when traversing a same combinational logic circuit depending on the other input signals. Because the uncertainty, a module critical path of this critical module is used to represent the overall clock frequency requirement. In a third scenario, different critical paths may be in operation state at different time in an activated critical module, meaning that requirement for clock frequency may change from clock cycle to clock cycle. Using the module critical path to represent an overall requirement for the clock frequency may simplify control function of the controller 150.

In an example, when the digital system 100 operates in module based mode, each module critical path is associated with a clock setting based on a pre-configuration. Specifically, by pre-configuration, one clock setting in the multiple preconfigured clock settings is associated or assigned to each critical module (or each module critical path). Taking the critical module 120a as an example, the association or assignment is conducted in a way that the assigned clock setting has a clock frequency that can accommodate the module critical path of the critical module 120a AND is the highest (fastest) frequency among frequencies of clock settings that can accommodate the module critical path. Thus, when an enable signal for activating the critical module 120a is received at the controller 150, the controller 150 will have knowledge about which critical module is activated, and can select the associated clock setting based on the enable signal.

In one example, one critical module 120a-120n is about to be activated while the digital system 100 is operating at the default frequency. The controller 150 selects a clock setting having a highest possible frequency that can accommodate the module critical path of the critical module 120a-120n.

In another example, multiple critical modules 120a-120n are in active states, and the controller 150 selects a slowest (lowest) frequency from multiple clock settings associated with the activated critical modules based on multiple enable signals, such that even the longest module critical path with a largest propagation delay can be accommodated. In an example, the controller 150 is implemented using a multiplexer which selects from multiple clock settings based on enable signals received.

In FIG. 2, the timing diagram 200 shows the clock signal 161, a first enable signal 211 for activating a first critical module 120a, a first bar graph 212 indicating state of the first critical module 120a, a second enable signal 221 for activating a second critical module 120b, a second bar graph 222 indicating state of the second critical module 120b. As shown, the clock frequency variation process includes 10 cycles of the clock signal 161, and cycle durations of these cycle varies during the process.

Initially, the digital system 100 operates at a default frequency having a cycle duration of 200 ps. No critical modules are in active state. During the first cycle, the first enable signal 211 is generated by the logic enabler 140, and the critical module 120a is activated accordingly (but logic paths are not in operation yet). Meanwhile, the controller 150 begins operation based on a trigger by the first enable signal 211.

During the second cycle, the clock duration does not change, (e.g., it maintains a value of 200 ps), and the critical module 120a starts to operate at the clock duration of 200 ps. Meanwhile, the controller 150 continues its operation, and completes its operation for the enable signal 211. The operation of the controller 150 includes selecting a clock setting based on the received enable signal 211, and transmitting a control signal 151 to the clock generator 160. In the current example, the critical module 120a is associated with a clock setting having a cycle duration of 300 ps. Accordingly, the controller 150 selects such a clock setting and transmits the control signal indicating this clock setting. Still during the second cycle, the clock generator 160 receives the control signal 151, and performs related function and gets ready, such that, when the rising edge of the third cycle comes, the clock generator 160 can be in an operation state generating a clock signal having a frequency of 300 ps.

At the beginning of the third cycle, the clock generator 160 varies the frequency of the clock signal 161, and cycle durations change from 200 ps to 300 ps. During the third cycle, the second enable signal 221 is generated, and the second critical module 120b is activated. Triggered by the enable signal 221, the controller 150 starts its operation. In the current example, the critical module 120b is associated with a clock setting corresponding to a frequency having a cycle duration of 400 ps. As preconfigured (for example, using a multiplexer), the controller 150 selects a clock setting from the clock settings corresponding to the two critical modules 120a and 120b, and the clock setting having a lower frequency is selected. In the current example, the clock setting having a cycle duration of 400 ps is selected. Subsequently, the controller 150 transmits a control signal 151 to the clock generator 160.

The operation of the controller 150 may or may not expand to the fourth cycle depending on operation speed of the controller 150. In responds to the control signal 151, during the third or the fourth cycle, the clock generator 160 performs related functions preparing for varying the clock frequency, and gets ready before the arrival of the rising edge of the fifth cycle. The above operations of the controller 150 and the clock generator 160 takes place during the period 234.

During the fifth cycle, the clock generator 160 varies the clock frequency from 300 ps per cycle to 400 ps per cycle, slowing down the digital system 100.

During the sixth cycle, the second enable signal terminates, and the critical module 120b is deactivated. Accordingly, as the enable signal terminates, the controller 150 and the clock generator 160 performs related functions during the period 236 before arrival of the rising edge of the eighth cycle. Based on the current enable signal, which is the first enable signal 211, the controller 150 selects the clock setting having a cycle duration of 300 ps. As a result, at the beginning of the eighth cycle, the clock generator 160 starts to generate a clock signal of 300 ps per cycle.

During the eighth cycle, the first enable signal 211 terminates, triggering the controller 150 to operate. The controller 150 detects there is no indication of enable signal, and select the clock setting corresponding to the default frequency. As a result, the clock frequency returns back to the default frequency during the tenth cycle. The digital system 100 starts to operate at the default frequency.

In the above example, there are delays 232, 234, 236, and 237 after an enable signal is changed (started or terminated) before the clock generator 160 can vary frequency of the clock signal 161. During those delays, the controller 150 and the clock generator 160 performs their functions in response to changes of the enable signals. Accordingly, in the example, during a first cycle, such as the cycles 233 and 235, of the operations of the activated critical modules, no critical paths are in operation. In this way, when the critical modules 120n-120n are activated while the digital system 100 is operating at the default frequency, the activated critical modules 120a and 120b can operate properly at the default frequency during the first cycle of their operations.

In one example, the logic path enabler 140 generates a trigger signal in advance of generating an enable signal for activating a critical module, such that the controller 150, in response to the trigger signal, can cause the clock generator 160 to vary the frequency of the clock signal 161 during a first cycle of the operation of the critical module. For example, in FIG. 2, before generating the second enable signal 221 during the third cycle, a trigger signal can be generated during the second cycle by the logic path enabler 140. The controller 150 starts its operation when receiving the trigger signal, and the clock generator 160 operates subsequently after receiving a control signal from the controller 150. The operations of the controller 150 and the clock generator 160 can take a period of time equal to the delay 234, but are completed before the start of the fourth cycle. At the beginning of the fourth cycle, when the critical module 120b starts to operate, for example, after being triggered by the rising edge of the clock signal 161, the clock generator 160 starts to generate a clock signal having a cycle duration of 400 ps. In this way, the critical modules 120a-120n can have module critical paths operating during a first cycle after the critical modules 120a-120n are activated. Such an arrangement renders flexibility to an IC design process.

Figure 3:
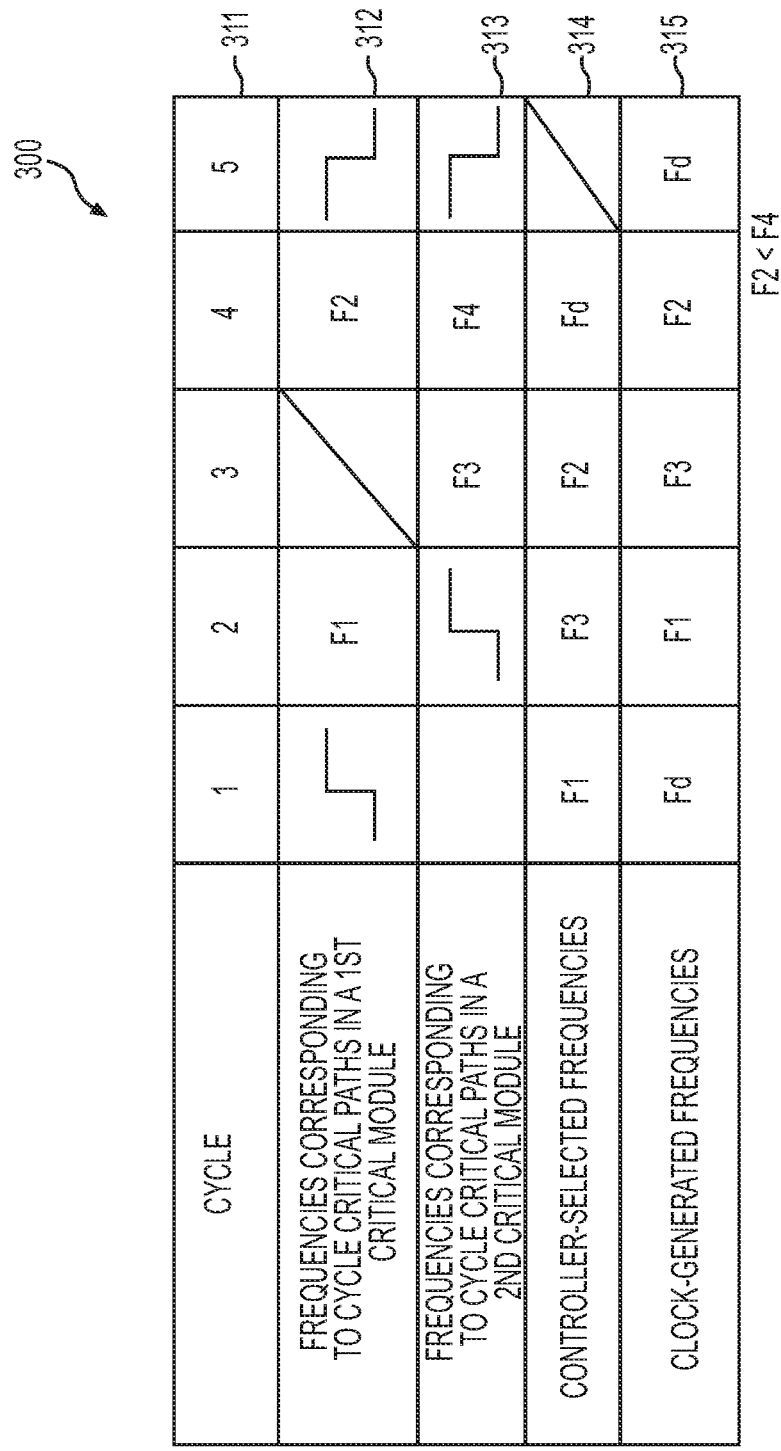
FIG. 3 shows a table illustrating another clock frequency variation process according to an embodiment of the disclosure.

FIG. 3 shows a table illustrating a clock frequency variation process according to an embodiment of the disclosure. During this clock frequency variation process, the digital system 100 is operating in cycle based mode to vary the clock frequency of the clock generator 160.

In cycle based mode, each critical module 120a-120n includes one or more cycle critical paths corresponding to one or more clock cycles of the clock signal 161 when activated. A cycle critical path of a cock cycle in a critical module 120a-120n refers to a critical path having the largest propagation delay among a group of critical paths that is in operation during the corresponding clock cycle in the critical module 120a-120n.

For example, a critical module 120a-120n when activated will operate for 3 clock cycles. During each clock cycle, different numbers of critical paths, for example, 0, 2, and 3 critical paths, are in operation, respectively. During the first cycle, no cycle critical path exists; during the second cycle, the one having a larger propagation delay among the two critical paths is the cycle critical path for the second cycle; during the third cycle, the one having a largest propagation delay among the three critical paths is the cycle critical path for the third cycle. The cycle critical paths for the second and third cycles may be the same or different logic paths, and can have a same or different propagation delays. Due to configuration of the circuitry 110, which logic paths will be in operation in which clock cycle is known in advance.

In one example, the digital system 100 operates in cycle based mode. When multiple critical modules 120a-120n are in active states during a period of time, for each clock cycle, there are cycle critical paths each included in different critical modules. In addition, for different clock cycles, members of the set of cycle critical path are different. The controller 150 causes the clock generator 160 to vary clock signals according to cycle critical paths of each clock cycle. In other words, the controller 150 causes the clock generator 160 to change the clock frequency cycle by cycle. In addition, the clock frequency generated for each cycle can accommodate the cycle critical paths of each cycle in all activated critical modules 120a-120n. Further, the clock frequency is the highest possible frequency among the multiple preconfigured clock settings.

In one example, when the digital system operates in cycle based module, each cycle critical path has an associated clock setting based on a pre-configuration. Specifically, by pre-configuration, one clock setting in the multiple preconfigured clock settings is associated with or assigned to each cycle critical path. Taking the critical module 120a as an example, the critical module 120a when activated can operate for 3 cycles, and for each cycle there are a first, second, third cycle critical paths, respectively. Each cycle critical path is associated with a clock setting. The association is conducted in a way that the clock setting associated has a clock frequency that can accommodate the cycle critical path AND is the highest (fastest) frequency among frequencies of clock settings that can accommodate the cycle critical path.

Thus, when an enable signal for activating the critical module 120a is received at the controller 150, the controller 150 will have knowledge about what clock setting is required for which clock cycle during the period when the critical module 120a is active. Accordingly, the controller 150 can select an associated clock setting for a corresponding clock cycle based on the enable signal.

In one example, one critical module 120a-120n is about to be activated while the digital system 100 is operating at the default frequency. Based on the enable signal, for each clock cycle, the controller 150 selects a clock setting having a highest possible frequency that can accommodate the cycle critical path of that cycle.

In another example, multiple critical modules 120a-120n are in active states. For each clock cycle, the controller 150 selects a clock setting having a slowest (lowest) frequency from multiple clock settings associated with the cycle critical paths of the each clock cycle based on multiple enable signals, such that, for each clock cycle, even the longest cycle critical path with a largest propagation delay can be accommodated.

In FIG. 3, the table 300 includes five rows. The first row 311 includes numbers indicating a sequence of clock cycles of the clock signal 161. The second row 312 includes two frequencies F1-F2 corresponding to two clock settings associated with two cycle critical paths of a first critical module 120a. The first critical module 120a when activated will operate for three cycles; however, there is no cycle critical path or any critical paths during the second cycle. The third row 313 includes two frequencies F3-F4 corresponding to two clock settings associated with two cycle critical paths of a second critical module 120b. The second critical module 120b when activated will operate for two cycles. The fourth row 314 includes four frequencies corresponding to clock settings which the controller 150 selected where the Fd representing the default frequency. The fifth row 315 includes five frequencies of the clock signal 161 at which the digital system 100 operates.

At the beginning of the first cycle of the clock frequency variation process illustrated by table 300, the digital system 100 operates at the default frequency Fd as shown in row 315, and the critical modules 120a-120b are not active. During the first cycle, a first enable signal is generated for activating the first critical module 120a. Triggered by the first enable signal, the controller 150 starts to operate.

First, based on the enable signal, and due to the configuration, the controller 150 will have knowledge about required clock settings corresponding to the two cycle critical paths of the first critical module 120a. As shown, in row 312, frequencies F1-F2 are required by the two cycle critical paths during the second and the fourth cycle of the process, respectively. Accordingly, the controller 150 selects a clock setting having the frequency F1 for the second cycle of the process. Next, the controller 150 then transmits a control signal to the clock generator 160. Based on clock setting information carried by the control signal, the clock generator 160 prepares suitable parameters, and gets ready for varying the clock signal 161. It is noted that in FIG. 3 example, the above operations of the controller 150 and clock generator 160 are completed within a time interval between receiving the enable signal and beginning of the second cycle of the process.

During the second cycle of the process, the digital system 100 slows down and operates at the frequency F1 as shown in row 315. Meanwhile, a second enable signal arrives for activating the second critical module 120b. Similarly, due to the pre-configuration, the controller 150 has the knowledge of clock settings corresponding to the two cycle critical paths of the third and the fourth cycles of the process in the second critical module 120b. Accordingly, the controller 150 selects a clock setting based on clock settings corresponding to cycle critical paths of the third cycle of the process in both the first and the second critical modules 120a/120b. As shown, there is no critical path for the critical module 120a in the third cycle of the process. Accordingly, the controller 150 selects a clock setting having a frequency of F3, as shown in row 314. Subsequently, the controller 150 and the clock generator 160 complete other related operations before the start of the third cycle.

During the third cycle, the digital system 100 operates at frequency F3 as shown in row 315. Although there is no enable signal arriving, the controller 150 still takes action to select a clock setting for the next fourth cycle. For the fourth cycle, there are two clock settings associated with two cycle critical paths in two critical modules 120a and 120b. Accordingly, the controller 150 selects a slower frequency F2 from the two frequencies F2 and F4 where F2 is loer than F4 in the FIG. 3 example.

During the fourth cycle, the digital system 100 operates at the frequency F2. The controller 150 continues to operate. As shown, during the fifth cycle, two critical modules 120a and 120b are deactivated, thus there is no active critical module in operation in the fifth cycle. Accordingly, the controller 150 selects the default clock setting, causing the clock generator to generate the default frequency.

During the fifth cycle, the digital system 100 operates at the default frequency Fd. Because there is no indication of new enable signals, the controller 150 pauses to operate. The digital system 100 continues to operate at the default frequency until a critical module is activated.

Figure 4:
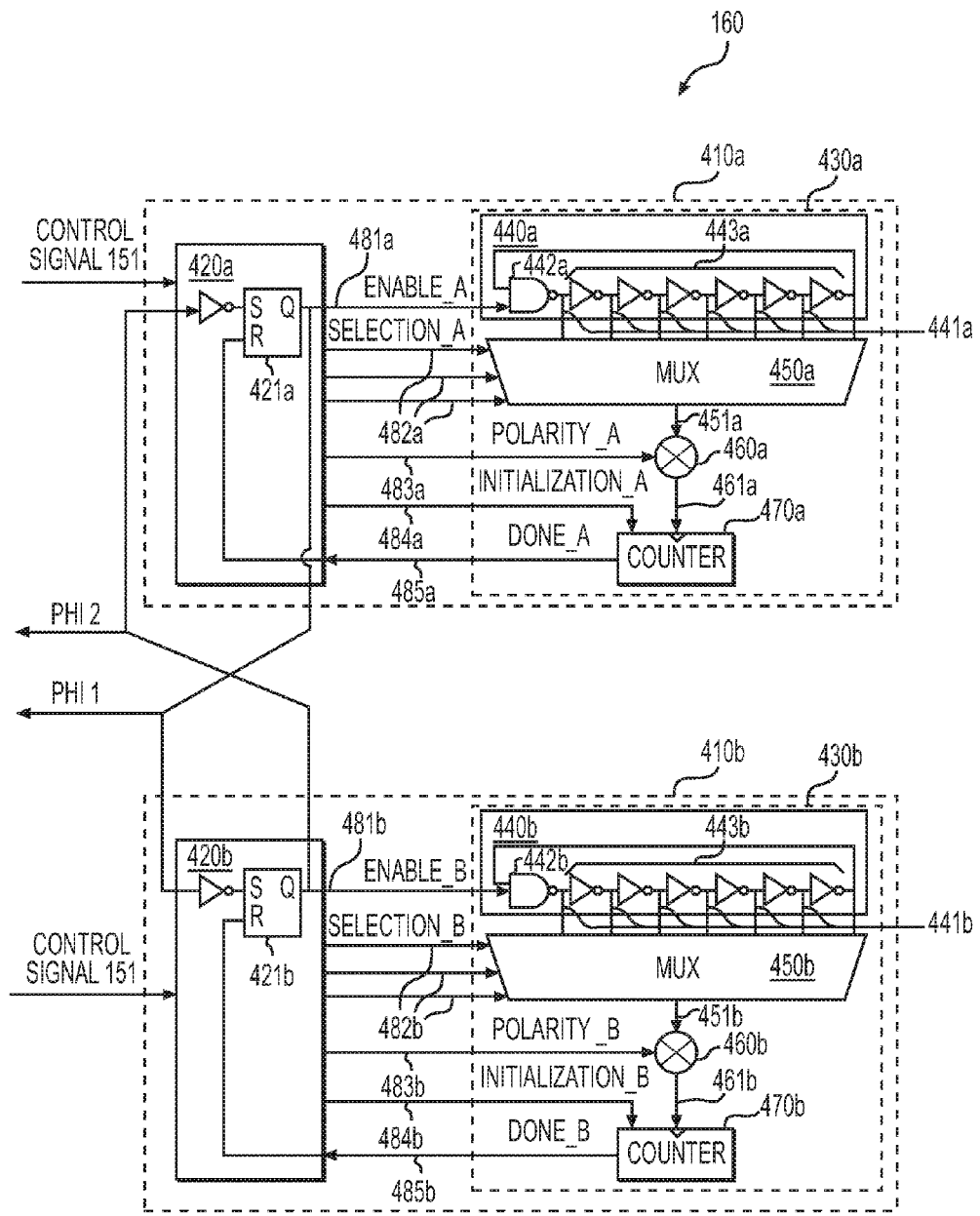
FIG. 4 shows a block diagram of an exemplary clock generator according to an embodiment of the disclosure.

FIG. 4 shows a block diagram of an exemplary clock generator 160 according to an embodiment of the disclosure. The clock generator 160 includes a first pulse generator 410a and a second pulse generator 410b cross-coupled together as shown in FIG. 4. The clock generator 160 generates a pair of periodic signals phi 1 and phi 2 forming a two phase clock signal 161. Pulse widths of the phi 1 and phi 2 signal vary based on received control signal 151.

Specifically, in an example, each pre-configured clock setting includes a first number of inversions and a second number of inversions. Each of the first or second number of inversions corresponds to a time interval for an inverter to complete that number of inversion operations, and the first and second number of inversions together are used to indicate a frequency or cycle duration of a clock signal 161 defined in the respective clock setting. Information of a clock setting is transferred to the clock generator 160 whenever the control signal 151 is transmitted. Accordingly, pulse widths of the periodic signals phi 1 and phi 2 are determined by the first number of inversions and second number of inversions, respectively, based on the received control signal 151. When values of the first number and the second number of inversions change corresponding to the controller 150 selecting different clock settings, the pulse widths of the periodic signals phi 1 and phi 2 will change accordingly. As a result, the frequency of the clock signal 161 changes.

In addition, the period of the periodic signals phi 1 and phi 2 is adjustable with a high resolution, such as a single inversion delay of an inverter gate, according to the first and second numbers of inversions.

In the FIG. 4 example, the first pulse generator 410a includes a clock controller 420a and an inversion counter 430a. Each time when the first pulse generator 410a is triggered, the first pulse generator 410a generates a pulse in the periodic signal phi 1. The pulse has a first pulse width corresponding to the first number of inversions indicated in the control signal 151. The inversion counter 430a includes a ring oscillator module 440a, a multiplexer module 450a, an XOR module 460a, and a counter module 470a. These elements can be coupled together as shown in FIG. 4.

The ring oscillator module 440a includes an N-stage ring oscillator. The ring oscillator module 440a receives an enable signal 481a from the clock controller 420a, and outputs a plurality of stage signals 441a. In an example, each stage outputs a stage signal 441a. The enable signal 481a enables or disables the N-stage ring oscillator. In the FIG. 4 example, the ring oscillator module 440a includes a seven-stage ring oscillator. The seven-stage ring oscillator includes a NAND gate 442a and six inverters 443a formed in a ring. When the enable signal 481a is logic "0", the seven-stage ring oscillator stops oscillating. When the enable signal 481a is logic "1", the seven-stage ring oscillator starts oscillating. Each stage provides a stage signal 441a. The stage signals 441a are provided to the multiplexer module 450a.

The multiplexer module 450a receives the plurality of stage signals 441a from the ring oscillator module 440a, and a selection signal 482a from the clock controller 420a. The selection signal 482a indicates which of the stage signals 441a is to be selected by the multiplexer module 450a. Based on the selection signal 482a, the multiplexer module 450a selects one of the stage signals 441a. In the FIG. 4 example, the multiplexer module 450a receives seven stage signals 441a from the ring oscillator module 440a, and receives a 3-bit selection signal 482a, indicated by three arrows 482a from the clock controller 420a. Based on the 3-bit selection signal 482a, the multiplexer module 450a selectively outputs one of the stage signals 441a as a selected stage signal 451a.

The XOR module 460a receives the selected stage signal 451a and a polarity signal 483a from the clock controller 420a, executes an XOR operation of the selected stage signal 451a and the polarity signal 483a to generate a counter trigger signal 461a, and provides the counter trigger signal 461a to the counter module 470a. The polarity signal 483a is provided by the clock controller 420a to suitably adjust a transition direction of a target signal transition edge with regard to the counter module 470a. In an example, the counter module 470a is rising edge triggered. When the target signal transition edge at a stage of the ring oscillator module 440a is a rising edge, the clock controller 420a provides "0" as the polarity signal 483a. However, when the target signal transition edge is a falling edge, the clock controller 420a provides "1" as the polarity signal 483a. It is noted that when the counter module 470a is falling-edge triggered, the polarity signal 483a can be suitably adjusted to change the transition direction of the target signal transition edge to be falling edge.

It is noted that, in an example, the XOR module 460a can be removed, and the polarity selection is implemented by other suitably technique. For example, a multiplexer is used at the input of the ring oscillator 440a to make the first transition either a rise transition or a fall transition based on a polarity signal, such as the polarity signal 483a.

The counter module 470a receives an initialization signal 484a from the clock controller 420a. Based on the initialization signal 484a, the counter module 470a initializes a counter value of the counter module 470a. The initialization signal 484a indicates the first number of inversions. Accordingly, the counter module 470a initializes the counter value in a way such that when the first number of inversions is completed at the ring oscillator module 440a, the counter module 470 will overflow.

Subsequently, the counter module 470a counts target signal transitions (rising edges or falling edges) in the counter trigger signal 461a, and provides a done signal 485s to the clock controller 420a when the counter module 470 is overflow. In an example, the first number of inversions is 36 according to a control signal 151. Accordingly, the target signal transition edge is a third rising edge at the first stage of the ring oscillator module 440a for completing 36 inversions before the target transition edge is detected. The counter module 470a includes a 4-bit rising edge counter, and the rising edge counter is initialized to "1101". Thus, after receiving three rising edge, the rising edge counter will overflow. The counter module 470a outputs logic "0" as the done signal 485a before receiving three rising edges, and sets the done signal 261 to logic "1" when three rising edges are received, and the rising edge counter overflows.

The clock controller 420a receives a control signal 151 from the controller 150. Based on the control signal 151, the clock controller 420a provides the selection signal 482a to the multiplexer module 450a, the polarity signal 483a to the XOR module 460a, and the initialization signal 484a to the counter module 470a.

In one example, the clock controller 420a receives a control signal 151. The control signal 151 is indicative of the first and second number of inversions. Based on the first number of the inversions, the clock controller 420a determines the selection signal 482a, the polarity signal 483a, and the initialization signal 484a. For example, the first number of inversions is 21. Accordingly, the clock controller 420a provides "111" as the selection signal 482a to select the seventh stage of the seven-stage ring oscillator. Further, due to the reason the twenty-first inversion is a falling edge, the clock controller 420a provides "1" as the polarity signal 483a. In addition, the clock controller 420a provides "1110" to the counter module 470a to initialize a 4-bit rising edge counter, due to the reason the twenty-first inversion is the second falling edge at the seventh stage.

When an enable signal 271 enables the ring oscillator module 440a to oscillate, the multiplexer module 450a selects the seventh stage signal as the selected stage signal 451a. The XOR module 460a suitably adjusts the transition direction of the counter trigger signal 461a. The counter module 470a counts in response to rising edges in the counter trigger signal 461a, for example. Thus, when the seventh stage signal has a first falling edge, the counter trigger signal 461a has a first rising edge. The first rising edge triggers the counter module 470a to count one more, and the counter module 470a becomes "1111". When the seventh stage signal has a second falling edge, the counter trigger signal 461a has a second rising edge. The second rising edge triggers the counter module 470a to count one more, and causes the counter module 470a to overflow. Upon overflow of the counter module 470a, the counter module 470a sets the done signal 485a to logic "1".

The clock controller 420a includes suitable circuitry to generate pulses having the first pulse width. In an example, the first pulse width is about the delay time based on the first number of inversions. In the FIG. 4 example, the clock controller 420a includes an S-R latch 421a. During operation, in an example, when the first pulse generator 410a is not triggered, the output (Q) of the S-R latch 421a has a relatively low voltage corresponding to logic "0," and disables the inversion counter 430a.

When the first pulse generator 410a is triggered, the S-R latch 421a receives a set signal, for example, the input S switches from logic "0" to logic "1," (e.g., from a relatively low voltage to a relatively high voltage). Then, the output Q of the S-R latch 421a switches from logic "0" to logic "1", and the periodic signal phi 1 also switches from logic "0" to logic "1" corresponding to a leading edge of a pulse.

When the output Q becomes logic "1," the ring oscillator module 440a is enabled to start oscillation, and the inversion counter 430a starts counting inversions propagated in the ring oscillator module 440a. When the inversion counter 430a counts to the first number of inversions, the counter module 470a generates the done signal. In an example, the done signal uses a pulse having a relatively small pulse width to indicate that the inversion counter 430a has counted to the first number.

The done signal resets the S-R latch 421a, thus the output Q of the S-R latch 421a switches from logic "1" to logic "0", and the periodic signal phi 1 also switches from logic "1" to logic "0" corresponding to a trailing edge of the pulse. When the output Q becomes logic "0," the ring oscillator module 440a is disabled. The pulse generated by the first pulse generator 410a has the first pulse width that is about the delay time of the first number of inversions.

The second pulse generator 410b operates similarly to the first pulse generator 410a. Each time when the second pulse generator 410*b* is triggered, the second pulse generator 410*b* generates a pulse in the periodic signal phi 2. The pulse has a second pulse width corresponding to a second delay time that is based on the second number of inversions indicated by a control signal 151.

The second pulse generator 410*b* utilizes certain components or signals that are identical or equivalent to those used in the first pulse generator 410*a* (for example, the S-R latch 421*b*, the inversion counter 430*b*, the ring oscillator module 440*b*, the plurality of stage signals 441*b*, the NAND gate 442*b*, the inverters 443*b*, the selected stage signal 451*b*, the counter trigger signal 461*b*, selection signal 482*b*, and the like, are identical to their counterparts in the first pulse generator 410*a*) and the description of these components or signals has been provided above and will be omitted here for brevity purposes. It is noted that the second number of inversions can be the same as the first number of inversions or can be different from the first number.

The first pulse generator 410*a* and the second pulse generator 410*b* are cross-coupled together, such that a trailing edge generated by one of the pulse generators triggers the other pulse generator to start generating a pulse. Thus, the first pulse generator 410*a* and the second pulse generator 410*b* alternatively generate pulses. The generated pulses form the pair of periodic signals phi 1 and phi 2. In the FIG. 4 example, the period of periodic signals phi 1 and phi 2 is the sum of the first pulse width and the second pulse width.

It is noted that the clock controller 420*a* and 420*a* include suitable circuitry such that the selection signal 482*a*/482*b*, the polarity signal 483*a*/483*b*, and the initialization signal 484*a*/484*b* can be provided during suitable time. For example, a control signal 151 is received during the phi 1 signal is in logic "0" state and the phi 2 signal is in logic "1" state. At the moment, the first pulse generator 410*a* is in disabled state while the second pulse generator 410*b* is active state counting versions. Thus, in the first pulse generator 410*a* the selection signal 482*a*, the polarity signal 483*a*, and the initialization signal 484*a* can be generated instantly to update the states of the multiplexer module 450*a*, the XOR module 460*a*, and the counter module 470*a*. While in the second pulse generator 410*b*, the clock controller holds the related circuitry for generating the selection signal 482*b*, the polarity signal 483*b*, and the initialization signal 484*b* until triggered, for example, by a done signal 485*b*.

It is also noted that the clock signal 161 (phi 1 and phi 2) generated at the clock generator 160 can be varied cycle by cycle. For example, three or more adjacent cycles of the clock signal 161 can be adjusted to have different frequencies by successively sending different control signals 151 corresponding to different clock settings to the clock generator 161.

It is noted that various changes can be made to the counter based clock generator 160. In an example, the counter module 470*a* is falling edge triggered. In another example, the NAND gate 442*a* is suitably configured to have a relatively shorter delay, such as a half delay of a normal inversion, in response to the enable signal 481*a*. Such configuration improves a delay resolution in the order of a half-inversion.

Figure 5:
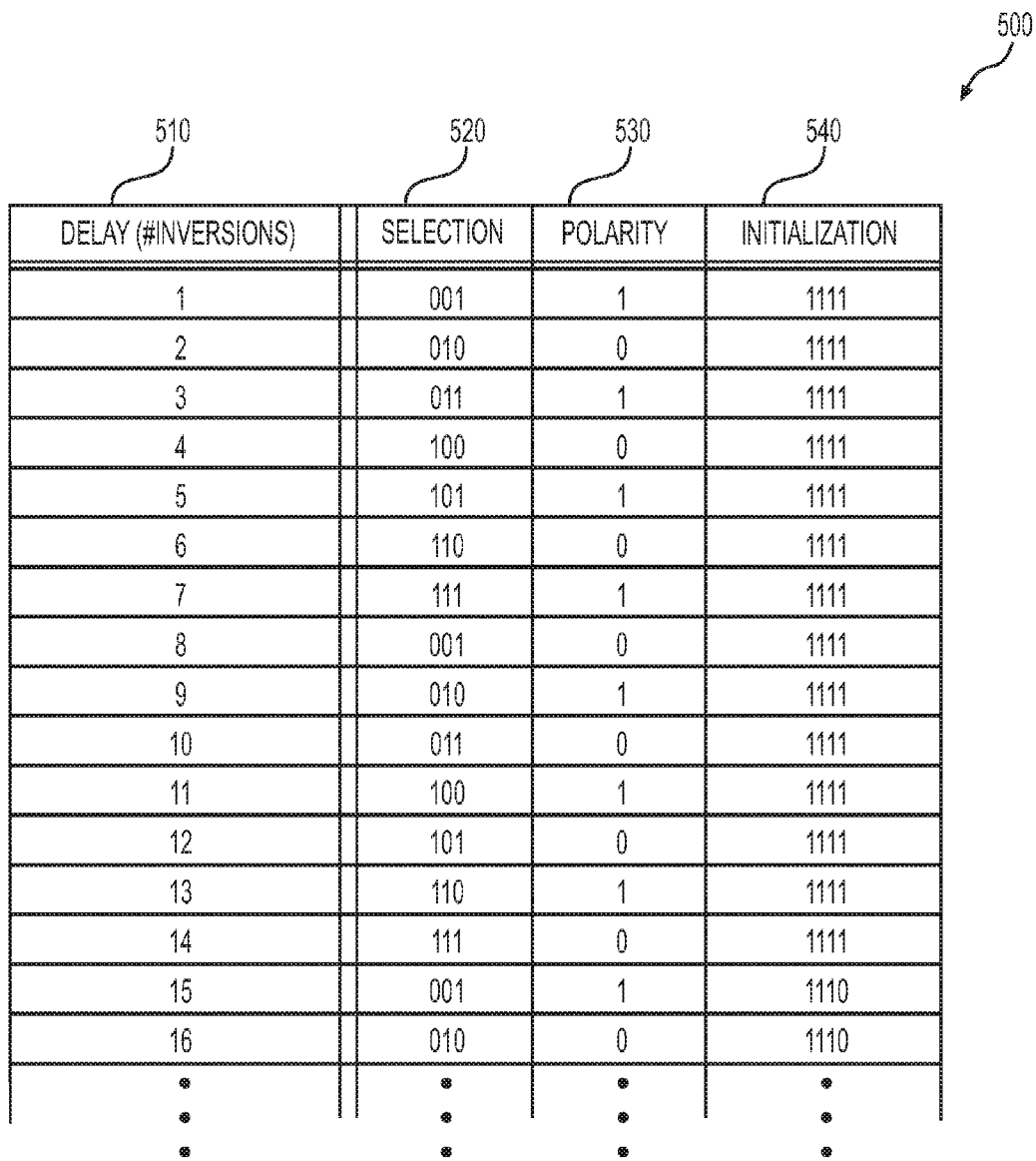
FIG. 5 shows a table of control signal examples provided by a clock controller according to an embodiment of the disclosure.

FIG. 5 shows a table 500 of control signal examples provided by the clock controller 420*a*/420*b* according to an embodiment of the disclosure. The table 500 includes a delay field 510, a selection signal field 520, a polarity signal field 530, and an initialization signal field 540. The delay field 510 indicates a number of inversions. The selection signal field 520 includes a three-bit binary value for configuring the multiplexer module 450*a*/450*b* to select a stage signal. The polarity signal field 530 includes a one-bit binary value to configure the XOR module 460*a*/460*b* to suitably adjust transition direction with regard to the counter module 470*a*/470*b*. The initialization signal field 540 includes a four-bit binary value for initializing the counter module 470*a*/470*b*.

Figure 6:
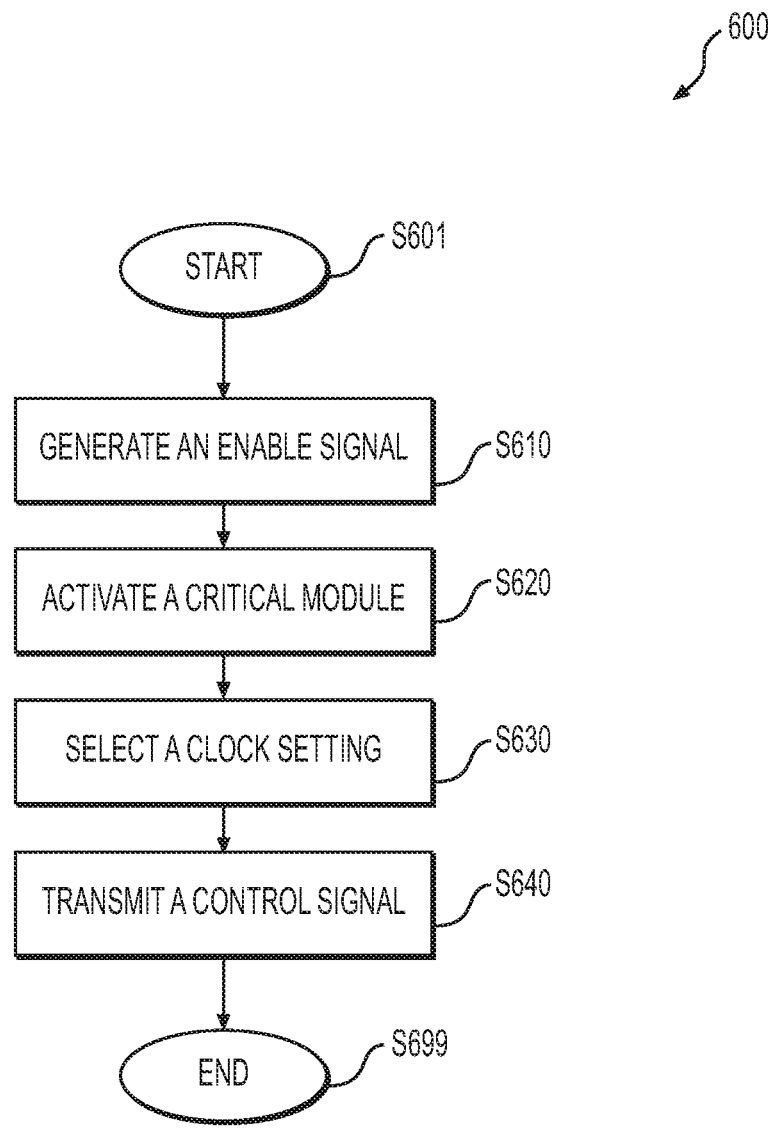
FIG. 6 shows a flow chart illustrating a process for varying a clock frequency to accommodate critical paths according to an embodiment of the disclosure.

FIG. 6 shows a flow chart illustrating a process 600 for varying a clock frequency to accommodate critical paths according to an embodiment of the disclosure. The digital system 100 is used as an example to describing the process 600. The process 600 starts at S601, and proceeds to S610.

At S610, one or more enable signals are generated at the logic path enabler 140. Each enable signal may correspond to one or more critical modules 120*a*-120*n*.

At S620, one or more critical modules corresponding to the one or more enable signals are activated by the corresponding enable signals. After activation, logic paths in the activated critical modules are about to operate when triggered by the clock signal 161. The logic paths include critical paths. Different critical module may be activated during different cycles of the clock signal depending when the corresponding enable signals are generated.

At S630, a clock setting is selected based on all received enable signals at the controller 150. When in module based mode, in an example, triggered by an arrival or termination of each enable signal received from the logic path enabler 140, a clock setting is selected. The selected clock setting has a highest possible frequency that can accommodate module critical paths in all activated critical module 120*a*-120*n*. Specifically, in one example, the clock setting having a lowest frequency among clock settings associated with the activated critical modules is selected.

When in cycle based mode, in an example, a clock setting is selected for a cycle of the clock signal, and different or same clock settings are selected for different cycles of the clock signal. In an example, a clock setting selected for a cycle has a highest possible frequency that can accommodate all cycle critical paths corresponding to the cycle in all activated critical modules. Specifically, in an example, the clock setting selected for a cycle is a clock setting having the slowest frequency among clock settings associated with cycle critical paths corresponding to the cycle in all activated critical modules.

At S640, a control signal indicating the selected clock setting is transmitted to the clock generator 160 to vary the frequency of the clock signal 161. In an example, the control signal is indicative of a first and a second numbers of inversions. Based on the first and the second number of inversions, the clock generator 160 generates the clock signal 161 whose frequency is determined by the first and second numbers.

While aspects of the present disclosure have been described in conjunction with the specific embodiments thereof that are proposed as examples, alternatives, modifications, and variations to the examples may be made. Accordingly, embodiments as set forth herein are intended to be illustrative and not limiting. There are changes that may be made without departing from the scope of the claims set forth below.

What is claimed is:

1. An integrated circuit, comprising:
   a clock generator configured to generate a clock signal having a clock frequency that is variable;
   circuitry that includes a plurality of critical modules that can be selectively turned on to operate under control of the clock signal, each critical module including one or more critical paths that a default clock frequency cannot accommodate;

a logic path enabler configured to generate enable signals to selectively turn on the plurality of critical modules; and a controller configured to receive the enable signals indicating respective critical modules that are tuned on, and, based on the enable signals, to causes the clock generator to vary the clock frequency of the clock signal to accommodate critical paths in the critical modules that are turned on.

2. The integrated circuit of claim 1, wherein the controller, based on the enable signals, selects a clock setting having a frequency that can accommodate the critical paths in the critical modules that are turned on from multiple preconfigured clock settings each corresponding to a predetermined clock frequency, and subsequently transmits a control signal indicating the selected clock setting to the clock generator.

3. The integrated circuit of claim 1, wherein, each critical module includes a module critical path having the longest propagation delay among logic paths in this module, and the controller causes the clock generator to generate a clock signal at a highest possible frequency that can accommodate module critical paths in each critical module that is turned on.

4. The integrated circuit of claim 3, wherein, each critical module has an associated clock setting having a highest clock frequency among multiple preconfigured clock settings having frequencies that can accommodate a module critical path of the each critical module, and the controller selects a clock setting having a lowest clock frequency from clock settings associated with critical modules that are turned on based on received enable signals when an enable signal arrives or terminates, and subsequently transmits a control signal indicating the selected clock setting to the clock generator.

5. The integrated circuit of claim 1, wherein, each critical module when turned on has one or more cycle critical paths corresponding to one or more cycles of the clock signal, each cycle critical path having the longest propagation delay among critical paths in operation during the corresponding cycle of the clock signal in the each critical module, and the controller causes the clock generator to generate, for a cycle of the clock signal, a clock signal at a highest possible frequency that can accommodate cycle critical paths corresponding to the cycle of the clock signal in critical modules that are turned on.

6. The integrated circuit of claim 5, wherein, each cycle critical path has an associated clock setting having a highest clock frequency among multiple preconfigured clock settings having frequencies that can accommodate the each cycle critical path, and the controller selects, for the cycle of the clock signal, a clock setting that has a lowest clock frequency from clock settings associated with cycle critical paths corresponding to the cycle of the clock signal in critical modules that are turned on based on received enable signals, and subsequently transmits a control signal indicating the selected clock setting to the clock generator.

7. The integrated circuit of claim 1, wherein, the logic path enabler generates a trigger signal in advance of generating an enable signal for activating a critical module, and the controller, in response to the trigger signal, causes the clock generator to vary the frequency of the clock signal when the critical module starts to operate.

8. The integrated circuit of claim 1, wherein, the circuitry further includes non-critical modules operating under control of the clock signal at the default frequency, and the controller causes the clock generator to change the frequency of the clock signal from the default frequency to a frequency that is lower than the default frequency when a critical module is turned on.

9. The integrated circuit of claim 1, wherein the clock generator generates the clock signal with a frequency being a function of a number of inversion delays.

10. The integrated circuit of claim 9, wherein the clock generator includes:

a first pulse generator configured to output first pulses, each first pulse having a first leading edge, a first trailing edge, and a first pulse width being a function of the inversion delays; and a second pulse generator configured to output second pulses, each second pulse having a second leading edge, a second trailing edge, and a second pulse width being a function of the inversion delays, wherein the first pulse generator and the second pulse generator are cross-coupled, such that the first pulse generator outputs one of the first pulses in response to the second trailing edge, and the second pulse generator outputs one of the second pulses in response to the first trailing edge.

11. A method, comprising:

generating enable signals at a logic path enabler to selectively turn on a plurality of critical modules that operate under control of a clock signal generated from a clock generator, each critical module including one or more critical paths that a default clock frequency cannot accommodate; and receiving, at a controller, the enable signals indicating respective critical modules that are turned on, and, based on the enable signals, causing the clock generator to vary a clock frequency of the clock signal to accommodate critical paths in the critical modules that are turned on.

12. The method of claim 11, wherein causing the clock generator to vary the clock frequency of the clock signal includes:

based on the enable signals, selecting a clock setting having a frequency that can accommodate the critical paths in the critical modules that are turned on from multiple preconfigured clock settings each corresponding to a predetermined clock frequency;

transmitting a control signal indicating the selected clock setting to the clock generator; and varying the clock frequency of the clock signal based on the selected clock setting.

13. The method of claim 11, wherein each critical module includes a module critical path having the longest propagation delay among logic paths in this module, and the method further comprising:

generating, by the clock generator, a clock signal at a highest possible frequency that can accommodate module critical paths in each critical module that are turned on.

14. The method of claim 13, wherein each critical module has an associated clock setting having a highest clock frequency among multiple preconfigured clock settings having frequencies that can accommodate a module critical path of the each critical module, and generating, by the clock generator, generate a clock signal at a highest possible frequency includes:

selecting a clock setting having a lowest clock frequency from clock settings associated with critical modules that are turned on based on received enable signals when an enable signal arrives or terminates; and transmitting a control signal indicating the selected clock setting to the clock generator to vary the clock frequency.

15. The method of claim 11, wherein each critical module when turned on has one or more cycle critical paths corresponding to one or more cycles of the clock signal, each cycle critical path having the longest propagation delay among critical paths in operation during the corresponding cycle of the clock signal in the each critical module, and the method further comprising:

generating, by the clock generator, for a cycle of the clock signal, a clock signal at a highest possible frequency that can accommodate cycle critical paths corresponding to the cycle of the clock signal in critical modules that are turned on.

16. The method of claim 15, wherein each cycle critical path has an associated clock setting having a highest clock frequency among multiple preconfigured clock settings having frequencies that can accommodate the each cycle critical path, and generating, by the clock generator, for a cycle of the clock signal, a clock signal includes:

selecting, for the cycle of the clock signal, a clock setting that has a lowest clock frequency from clock settings associated with cycle critical paths corresponding to the cycle of the clock signal in critical modules that are turned on based on received enable signals; and transmitting a control signal indicating the selected clock setting to the clock generator.

17. The method of claim 11, further comprising:

generating a trigger signal in advance of generating an enable signal for activating a critical module; and in response to the trigger signal, varying, by the clock generator, the frequency of the clock signal when the critical module starts to operate.

18. The method of claim 11, further comprising:

changing, by the clock generator, the frequency of the clock signal from the default frequency to a frequency that is lower than the default frequency.

19. The method of claim 11, further comprising:

generating the clock signal with a frequency being a function of a number of inversion delays.

20. The method of claim 19, further comprising:

outputting first pulses at a first pulse generator, each first pulse having a first leading edge, a first trailing edge, and a first pulse width being a function of the inversion delays; and outputting second pulses at a second pulse generator, each second pulse having a second leading edge, a second trailing edge, and a second pulse width being a function of the inversion delays, wherein the first pulse generator and the second pulse generator are cross-coupled, such that the first pulse generator outputs one of the first pulses in response to the second trailing edge, and the second pulse generator outputs one of the second pulses in response to the first trailing edge.

\* \* \* \* \*